United States Patent [19]

Shiiki et al.

[11] Patent Number: 4,576,876
[45] Date of Patent: Mar. 18, 1986

[54] MAGNETIC RECORDING MEDIUM

[75] Inventors: Kazuo Shiiki, Tsukui; Yoshihiro Shiroishi, Hachioji; Osamu Kitakami; Yasutaro Uesaka, both of Kokubunji, all of Japan

[73] Assignees: Hitachi, Ltd, Tokyo; Hitachi Maxell, Ltd., Ohsaka, both of Japan

[21] Appl. No.: 651,937

[22] Filed: Sep. 19, 1984

[30] Foreign Application Priority Data

Sep. 19, 1983 [JP] Japan ................ 58-171375

[51] Int. Cl.⁴ .............................................. G11B 5/66
[52] U.S. Cl. ................................... 428/679; 428/212; 428/900; 420/435; 360/131; 360/132; 360/133; 360/134; 427/131; 427/132
[58] Field of Search .............. 428/679, 900, 212; 360/131-134; 427/131-132; 420/435

[56] References Cited

U.S. PATENT DOCUMENTS 4,210,946 7/1980 Iwasaki et al. ................. 360/131

FOREIGN PATENT DOCUMENTS 56-130449 10/1981 Japan ................ 420/435
59-38349 3/1984 Japan ................ 420/435

Primary Examiner—Veronica O'Keefe
Attorney, Agent, or Firm—Antonelli, Terry & Wands

[57] ABSTRACT

A magnetic recording medium comprising a substrate, an underlayer provided on the substrate and having a high permeability magnetic film and a relative permeability in all directions in the film surface of not less than 800, and a recording medium layer provided on the underlayer and having a perpendicular anisotropy. The recording and reproduction characteristics of this magnetic recording medium do not vary even when the direction of movement thereof with respect to a magnetic head varies. When it is applied to a magnetic disc, preferable results can be obtained.

16 Claims, 4 Drawing Figures

MAGNETIC RECORDING MEDIUM

BACKGROUND OF THE INVENTION

This invention relates to a complex, vertical, magnetic recording medium comprising an underlayer of soft magnetic film with high permeability, and a recording medium layer provided on the underlayer, and more particularly to a complex, vertical, magnetic recording medium having improved recording and reproduction characteristics.

A complex, vertical, magnetic recording medium comprising an underlayer of soft magnetic film with high permeability, and a recording medium layer with perpendicular anisotropy, provided on the underlayer directly or indirectly via an intermediate layer, generates a higher reproduction output and requires a smaller recording current than a vertical, magnetic recording medium having no underlayer with high permeability. Namely, the former vertical, magnetic recording medium can be used with a high efficiency, and is practically the most preferable vertical magnetic recording medium. However, when a magnetic disc, which consists of a conventional, vertical, magnetic recording medium having a high permeability underlayer, is put into practical operation, the recording and reproduction characteristics thereof vary greatly as shown in FIG. 1 (which shows the envelope of the waveform of a reproduction output) during one turn of the disc due to the magnetic anisotropy of the underlayer. Therefore, such a magnetic disc cannot be used in practice. If the permeability of the underlayer is reduced to a low level, the magnetic anisotropy thereof becomes low, but the efficiency of the disc decreases. Consequently, providing the underlayer in the vertical, magnetic recording medium becomes meaningless.

Such a complex, vertical, magnetic recording medium as described above is disclosed in, for example, U.S. Pat. No. 4,210,946.

SUMMARY OF THE INVENTION

An object of the present invention is to provide a complex, vertical, magnetic recording medium which has recording and reproduction characteristics that do not substantially vary (or vary only to a practically negligible extent) when a magnetic disc of the medium is rotated, and which, moreover, exhibits a high efficiency.

In order to achieve the above object, the magnetic recording medium according to the present invention is made of a substrate, a underlayer provided on the substrate and having at least one layer of a high permeability, magnetic film and a relative permeability in all directions in the film surface of not less than 800, and a recording medium layer provided on the underlayer directly or indirectly via an intermediate layer.

When a high permeability magnetic film is formed by an evaporation method or a sputtering method, the induction magnetic anisotropy occurs therein due to the external magnetic field, such as the earth magnetic field, or the uniaxial magnetic anisotropy due to the uneven internal stress, so that the permeability in the surface of the magnetic film becomes anisotropic. It is very difficult to eliminate such anisotropy completely from the magnetic film. The results of a thorough research on the influence of an underlayer film upon the recording and reproduction characteristics of a magnetic recording medium show the following. When the permeability of a underlayer film is in a lower range, the efficiency of the magnetic recording medium is improved substantially in proportion to the permeability of the underlayer film. When the permeability of the film increases to a higher level, the efficiency of the recording medium is saturated. Namely, when the permeability of the underlayer film is not less than a certain level, i.e. 800, the recording and reproduction characteristics of the magnetic recording medium can be practically considered to be constant. It has been ascertained that, when a underlayer film is made of a material having a low magnetic anisotropy or multi-axial magnetic anisotropy to obtain a underlayer having a comparatively high permeability in all directions in the film surface, the above-mentioned drawbacks encountered in a conventional, complex, magnetic recording medium can be eliminated.

The present invention has been achieved on the basis of above-mentioned discoveries made by the inventors of the present invention.

As generally known, the above-mentioned layer of a recording medium consists of a film of a magnetic recording material having perpendicular, magnetic anisotropy, such as a Co—Cr alloy film containing, for example, 5–25 weight percent of Cr. This film is formed usually by a sputtering method, a vacuum evaporation method or a chemical vapor deposition method, in which a material is deposited in a gaseous phase. Especially, the sputtering method is most widely used. The thickness of such a film is usually 0.1–3 $\mu$m. The film employed in the present invention can be formed to this thickness but the thickness of the film is not limited thereto.

The underlayer provided under the recording medium layer and having a high permeability magnetic film thereon may consist of any magnetic material which has a relative permeability in all directions in the film surface of not less than 800 at a maximum frequency of the recording current in use, for example, a permalloy having a typical composition of Ni-19 wt % Fe, sendust of Fe—Si—Al alloy, Fe—Si alloy (all of these alloys are crystalline alloys), and a ferromagnetic amorphous alloy. A ferromagnetic amorphous alloy mostly contains Co, Fe or Ni as a main component.

However, when a magnetic film is formed by depositing these magnetic materials for an underlayer in an ordinary manner in a gaseous phase, a large magnetic anisotropy occurs in a film of any of these materials, and the relative permeability in the low permeability direction of the film becomes less than 800. According to the present invention, a magnetic field is applied to a magnetic material while it is deposited on a substrate in a gaseous phase, and the magnetic field is turned relatively to the substrate. The magnetic film thus formed has a comparatively high permeability and a small anisotropy of permeability. Therefore, when this film is used as an underlayer, a complex, magnetic recording medium having excellent recording and reproduction characteristics can be obtained. The magnetic field may be turned continuously or intermittently at predetermined time intervals. The magnetic field is turned at least 0.5 turn (180°) until the formation of an underlayer is completed. The intensity of a magnetic field to be applied to a magnetic material is set to 20 Oe–15 kOe. It is difficult to uniformly generate a magnetic field of higher than 15 kOe in a large disc as a whole. When the magnetic field is lower than 20 Oe, the effect of an external magnetic field cannot be eliminated sufficiently. Accordingly, applying a magnetic field of an intensity out of the mentioned range is not preferable. It is needless to say that any method of forming a magnetic film, which is other than the above-mentioned methods, may be used provided that it is capable of reducing the magnetic anisotropy in the film, and increasing a minimum relative permeability thereof to not less than 800.

It is said that a suitable thickness of an underlayer is not less than 0.1 $\mu$m, as disclosed in, for example, U.S. Pat. No. 4,210,946, and it is not necessary in particular to change this thickness in the present invention as well. Forming an underlayer film on a substrate is done by a sputtering method, a vacuum evaporation method or a chemical vapor deposition method, in all of which a magnetic material is deposited on a substrate in a gaseous phase and a plating method is also possible. Especially, the sputtering method is most widely used.

In order to improve the magnetic characteristics in a high-frequency region of a magnetic medium, inserting a non-magnetic film between two magnetic films or alternately laminating some non-magnetic films and some magnetic films is done generally. These methods may be applied to the underlayer film mentioned above. Also, a method disclosed in the patent application filed in Japan as Japanese Patent Application No. 4270/1983, and U.S.A. (Ser. No. 571099) and Europe (Application No. 84100437.7 filed in EPC with Great Britain, West Germany, France and Netherlands designated) by claiming the priority of the mentioned Japanese application (all of these applications are merely prior applications, and what are disclosed therein are not the prior art), i.e. a method of inserting a ferromagnetic film or an anti-ferromagnetic film between two primary magnetic films, each of which consists of a ferromagnetic material different from that of the mentioned ferromagnetic film, or alternately laminating some pieces of these two types of films, to reduce the anisotropy and increase the permeability of the resultant film may be applied to the formation of the underlayer film. When not less than three primary magnetic films are used, both a magnetic film of a magnetic material different from that of the primary magnetic films, and a non-magnetic film may be inserted thereamong.

A substrate, on which an underlayer is formed, consists as generally known of a non-magnetic material, for example, glass, quartz, alumina, a polymeric resin, aluminum, or an aluminum alloy. The magnetic recording medium according to the present invention is useful, especially when it is applied to a magnetic disc. In this case, a circular or cylindrical substrate is usually used. Between the substrate and underlayer, a non-magnetic layer of, for example, $SiO_2$, $Al_2O_3$ or $TiO_2$ may be provided in a known manner for the purpose of improving the bond strengths thereof. An intermediate layer of a non-magnetic material, such as $SiO_2$, $TiO_2$, $Al_2O_3$, Ti, Cr, Al, Ge, Si, Mo, W, Cu, and Au may also be provided between an underlayer and a recording medium layer in a known manner. This enables the bond strengths of these layers to be improved. Especially, when an intermediate layer containing crystals of a hexagonal system, such as Ti and Zn is formed so that the c-axis of the layer extends at right angles to the substrate surface, the perpendicular anisotropy of a recording medium layer formed on the upper surface of the intermediate layer is improved.

Regarding the matter not described in the specification of the present invention, the knowledge known in this technical field may be utilized.

DESCRIPTION OF THE PREFERRED EMBODIMENTS

Figure 2:
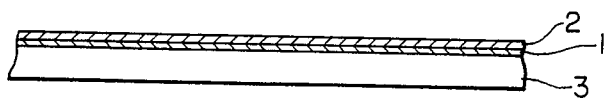
FIG. 2 is a sectional view of an embodiment of a magnetic recording medium according to the present invention.

The sample shown in FIG. 2 is a complex, vertical, magnetic recording medium consisting of an underlayer 1 of a non-crystalline alloy film of $Co_{73}Zr_{15}Mo_{12}$, and a perpendicular anisotropic film 2 of $Co_{80}Cr_{20}$. The $Co_{80}Cr_{20}$ film is 0.2 $\mu$m thick, and the $Co_{73}Zr_{15}Mo_{12}$ film 1 $\mu$m thick. These films are laminated on a glass plate 3 having a diameter of 4.5 cm, to form a disc.

A prior art magnetic recording medium in which a minimum relative permeability in the film surface of its underlayer 1 is less than 800, and a magnetic recording medium according to the present invention in which the relative permeability in all directions in the film surface of its underlayer is not less than 800 will now be described.

Figure 1:
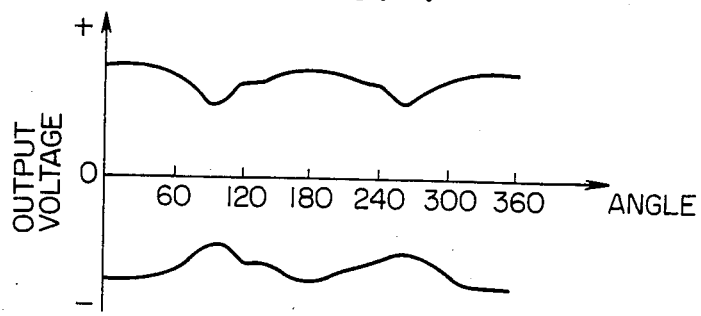
FIG. 1 is a graph showing the fluctuations of an output from a magnetic disc having a conventional, complex, vertical, magnetic recording medium provided with a high permeability underlayer with respect to an angle of rotation thereof.

First, the recording and reproduction characteristics of a magnetic disc having a $Co_{73}Zr_{15}Mo_{12}$ film formed by a regular sputtering method were determined. It was ascertained that an output from the disc varies depending upon the direction, i.e. an angle of rotation, as shown in FIG. 1. In particular, FIG. 1 shows an envelope of a waveform of an output at a recording density of 50KBPI, i.e. the results of measurement conducted during a recording and reproduction operation, at a relative rotational speed of 2m/s by using a ferrite ring type head having a gap length of 0.3 $\mu$m. The dependence of the permeability of the $Co_{73}Zr_{15}Mo_{12}$ film upon the direction was determined additionally, and the results were analyzed correspondingly to the levels of outputs from the disc to discover the following. The relative permeability of this film is the lowest, i.e. about 200, in the direction of movement of the recording medium at an angle of rotation at which the level of an output becomes the lowest; and the highest, i.e. about 1500, in the direction of movement of the recording medium at an angle of rotation at which the level of an output becomes the highest. It was further ascertained that, when the relative permeability of an underlayer is not less than 800, and preferably not less than 1000, the level of an output from the disc is substantially constant. The direction in which the relative permeability of an underlayer becomes the lowest was found to be substantially in agreement with the direction in which the earth magnetic field extends.

Figure 3:
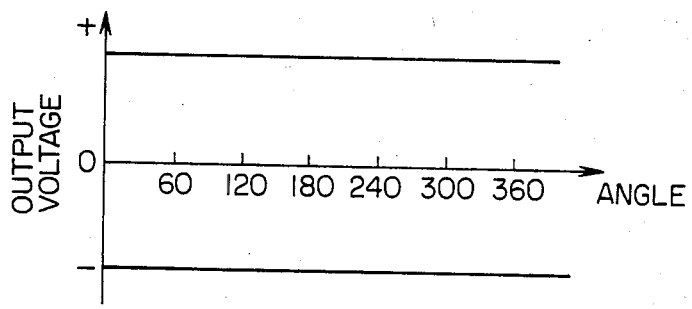
FIG. 3 is a graph showing the relation between an output from a magnetic disc having an embodiment of a magnetic recording medium according to the present invention and an angle of rotation of the disc.
Figure 4:
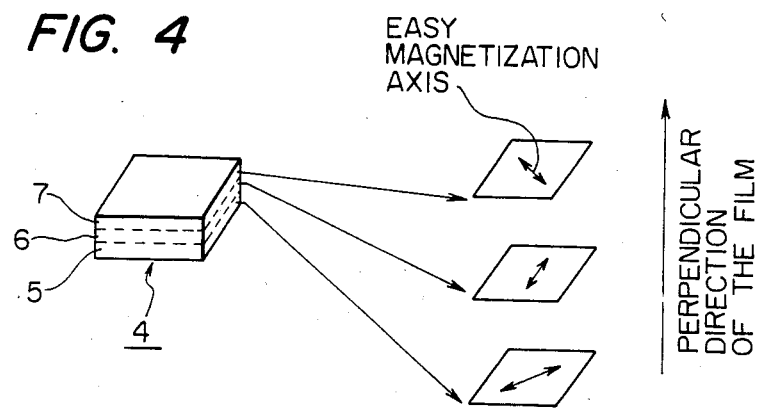
FIG. 4 shows the distribution of the magnetization-facilitating axes in the direction of the thickness of a high permeability underlayer in a magnetic recording medium embodying the present invention.

A sputtering method was then carried out for one hour in accordance with the present invention to form a $Co_{73}Zr_{15}Mo_{12}$ film of about 1 μm in thickness by applying a magnetic field of an intensity of about 500 Oe to a glass substrate in the direction of the film surface as the direction of the magnetic field was varied 30° every 10 minutes in the direction of the magnetic field. Namely, an average rotational speed of the magnetic field was 0.5 turn/h. The magnetic construction of such a film was observed. FIG. 4 schematically shows a squarely cut piece of a film formed during a 30-minute sputtering operation. As shown in the drawing, the film 4 formed by this sputtering method consists of layers 5, 6, 7 formed in each 10 minutes, the easy magnetization axes in which extend in different directions. In view of the fact that the film has a multi-easy magnetization axes, it is understood that the easy magnetization axis of the film was turned around an axis extending in the direction of the thickness thereof, every time the direction of the magnetic field varied during the sputtering operation, to cause the so-called helical anisotropy to occur in the film. The lowest relative permeability of this film was 2000, and the highest relative permeability thereof 3000. The dependency of the recording reproduction characteristics of a vertical, magnetic recording medium having an underlayer 1 of such a $Co_{73}Zr_{15}Mo_{12}$ film and a perpendicular anisotropic magnetic film 2 formed thereon upon the angle of rotation of the disc was determined in the same manner as in the case shown in FIG. 1, to obtain the results shown in FIG. 3. As is understood from the drawing, the fluctuations of the level of an output from the disc using a recording medium according to the present invention can substantially be ignored as compared with those shown in FIG. 1 in a disc using a conventional recording medium.

In the above embodiment, the $Co_{73}Zr_{15}Mo_{12}$ film was formed as the magnetic field applied thereto was turned intermittently during the sputtering operation. When such a film was formed as the magnetic field was turned continuously, the same results were also obtained. The rotational speed was set to 0.5 turn/h. The sputtering effect in such a magnetic field differs depending upon the kind of material in use. According to the results of experiments made by the inventors, it has been found that a marked sputtering effect can be obtained when a noncrystalline magnetic alloy having Co group, of which the typical examples are $Co_{73}Zr_{15}Mo_{12}$ and $(Co_{0.94}Fe_{0.06})_{75}Si_{15}B_{10}$, or a polycrystalline alloy containing Ni and Fe as the main components, of which the typical example is Ni—19 wt % Fe, is used. When these alloys are sputtered in a regular manner, the anisotropy which is large in one direction occurs in the resultant film, and the maximum and minimum permeabilities thereof differ extremely. However, when the sputtering is done as the magnetic field applied to the film is turned, to cause the multiaxial anisotropy to occur therein, a total permeability of the film increases to a high level, and a ratio of a maximum permeability to a minimum permeability decreases to a low level. This sputtering method has such a marked effect, and is a specially preferable method to be used for practicing the present invention.

In general, the high-density recording is done in a high-frequency region, so that a magnetic recording medium is required to have a high permeability with respect to a high frequency. The recording by a magnetic recording disc having an underlayer film of not less than about 1 μm in thickness may be done without any special problems even in a frequency region of 10-30 MHz. When the thickness of the underlayer film is on the order of 2-3 μm, the permeability thereof tends to decrease. In order to prevent a decrease in the permeability of the film, it is more preferable to laminate films with a layer of an insulating material, such as $SiO_2$ and $Al_2O_3$ or a layer of a non-magnetic metal, such as Al inserted thereamong in a known manner than to carry out a deposition operation continuously while merely turning a magnetic field applied to the film. In another embodiment of the present invention, layers of two kinds of ferromagnetic materials, such as a Fe—Si alloy and a Ni—Fe alloy, or a layer of a ferromagnetic material and a layer of an anti-ferromagnetic material, such as a Fe—Mn alloy are laminated. In this embodiment, the anisotropy of the film becomes small, and the permeability thereof high. Such a laminated film can also be used as an underlayer film.

An alloy film containing Fe, Si and Al as a main component has a comparatively low permeability of about 850 but it has a small anisotropy of permeability; this film was found to be usable as an underlayer film.

The present invention as described above can provide a complex, vertical, magnetic recording medium which has excellent recording and reproduction characteristics which do not substantially vary even when the direction of movement thereof with respect to a magnetic head varies, and which is capable of being preferably applied to a magnetic disc.

Obviously, many modifications and variations of the present invention are possible in the light of the above teachings. It is therefore to be understood that, within the scope of the appended claims, the invention may be practiced otherwise than as specifically described.

What is claimed is:

1. A complex, magnetic recording medium comprising a substrate, an underlayer provided directly or indirectly on said substrate, said underlayer including at least one magnetic film with high permeability, and a recording medium layer provided directly or indirectly on said underlayer, said underlayer having a relative permeability of not less than 800 in all directions of the film surface.

2. A magnetic recording medium according to claim 1, wherein said high permeability magnetic film has such distribution of easy magnetization axes that varies continuously or intermittently in accordance with variations in the thickness thereof and in the circular direction around an axis extending at right angles to the film surface.

3. A magnetic recording medium according to claim 1, wherein said recording medium layer has a perpendicular anisotropy.

4. A magnetic recording medium according to claim 3, wherein said recording medium layer consists of a Co—Cr alloy.

5. A magnetic recording medium according to claim 1, wherein a non-magnetic intermediate layer is provided between said substrate and said underlayer.

6. A magnetic recording medium according to claim 1, wherein a non-magnetic intermediate layer is provided between said underlayer and said recording medium layer.

7. A magnetic recording medium according to claim 1, wherein at least one of said high permeability magnetic films consists of a crystalline alloy containing Ni or Fe as a main component thereof, or a non-crystalline alloy containing Co as a main component thereof.

8. A magnetic recording medium according to claim 1, wherein said underlayer has at least two said high permeability magnetic films, between which a non-magnetic film and/or a magnetic film different from said high permeability magnetic film are provided.

9. A magnetic recording medium according to claim 1, wherein the at least one magnetic film with high permeability is made of a material selected frm the group consisting of permalloy, Fe—Si—Al alloy, Fe—Si alloy and ferromagnetic amorphous alloy.

10. A magnetic recording medium according to claim 1, wherein said at least one magnetic film with high permeability is at least one magnetic film deposited on said substrate while a magnetic field is being applied thereto, the magnetic field being turned relative to the substrate during the depositing of the at least one magnetic film.

11. A magnetic recording medium according to claim 10, wherein the deposited at least one magnetic film is formed using a magnetic field intensity, of said magnetic field applied during the deposition of the at least one magnetic film, of 20 Oe–15 kOe.

12. A magnetic recording medium according to claim 1, wherein said underlayer has a thickness of not less than 0.1 $\mu$m.

13. A magnetic recording medium according to claim 9, wherein the substrate is made of a non-magnetic material.

14. A magnetic recording medium according to claim 13, wherein the non-magnetic material is selected from the group consisting of glass, quartz, alumina, aluminum and alloys thereof, and polymeric resins.

15. A magnetic recording medium according to claim 6, wherein said intermediate layer contains crystals of a hexagonal system, formed so that the c-axis of said intermediate layer extends at right angles to the substrate surface.

16. A magnetic recording medium according to claim 1, wherein the relative permeability of the underlayer is not less than 1000 in all directions of the film surface.

* * * * *